(12) United States Patent
Nakahira et al.

(10) Patent No.: US 8,182,637 B2
(45) Date of Patent: May 22, 2012

(54) SYSTEM AND METHOD FOR MANUFACTURING OPTICAL DISPLAY

(75) Inventors: Yasushi Nakahira, Ibaraki (JP); Hideo Abe, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/342,520

(22) Filed: Jan. 3, 2012

(65) Prior Publication Data

US 2012/0097316 A1    Apr. 26, 2012

Related U.S. Application Data

(62) Division of application No. 12/093,190, filed as application No. PCT/JP2006/319660 on Oct. 2, 2006.

(30) Foreign Application Priority Data

Nov. 17, 2005    (JP) .................................. 2005-332740

(51) Int. Cl.
*B29C 65/00*    (2006.01)
*B32B 37/00*    (2006.01)

(52) U.S. Cl. ........ 156/256; 156/250; 156/252; 156/253; 156/269; 156/289; 156/324; 156/350; 156/353; 156/354; 156/355; 156/378; 156/379; 156/510

(58) Field of Classification Search ................... 156/250, 156/252, 253, 256, 269, 289, 324, 350, 353, 156/354, 355, 378, 379, 510
See application file for complete search history.

(56) References Cited

U.S. PATENT DOCUMENTS

| | | | |
|---|---|---|---|
| 6,582,775 B1 | 6/2003 | Payne et al. | |
| 2004/0095526 A1 | 5/2004 | Yamabuchi et al. | |
| 2004/0169809 A1 | 9/2004 | Yamabuchi et al. | |
| 2004/0209007 A1 | 10/2004 | Satake et al. | |
| 2005/0016670 A1 | 1/2005 | Kanbara et al. | |

FOREIGN PATENT DOCUMENTS

CN    1537251 A    10/2004

(Continued)

OTHER PUBLICATIONS

Supplementary European Search Report dated May 19, 2010, issued in corresponding European Patent Application No. 06811008.9.
Chinese Office Action dated Jan. 14, 2011, issued in corresponding Chinese Patent Application No. 200680040379.2.
European Office Action dated Mar. 23, 2011, issued in corresponding European Patent Application No. 06811008.9.

(Continued)

*Primary Examiner* — Khanh P Nguyen
*Assistant Examiner* — Carson Gross
(74) *Attorney, Agent, or Firm* — Westerman, Hattori, Daniels & Adrian, LLP (57) ABSTRACT

An object of the invention is to provide an optical display manufacturing system or method that allows an increase in the yield of an optical film, a reduction in cost and an improvement in inventory control. An optical display manufacturing system includes feeding means (11, 14) that feeds a belt and sheet-shaped product (3) having an optical film from a roll (4) of the belt and sheet-shaped product, detection means (12) that detects a defect of the belt and sheet-shaped product fed by the feeding means, cutting means (13) that cuts the belt and sheet-shaped product into individual sheet-shaped products based on the result of the detection, transfer means (16) that transports each of the sheet-shaped products from the cutting process to a sticking process, and sticking means (17) that sticks the transported sheet-shaped product to an optical display unit.

4 Claims, 3 Drawing Sheets

FOREIGN PATENT DOCUMENTS

| | | | |
|---|---|---|---|
| JP | 57-52017 | * | 3/1982 |
| JP | 57-52017 | A | 3/1982 |
| JP | 2001-305348 | A | 10/2001 |
| JP | 2003-161935 | A | 6/2003 |
| JP | 2003-344302 | A | 12/2003 |
| JP | 2004-012765 | A | 1/2004 |
| JP | 2004-118012 | A | 4/2004 |
| JP | 2004-167673 | A | 6/2004 |
| JP | 2005-134573 | A | 5/2005 |
| WO | 03/046647 | A1 | 6/2003 |

OTHER PUBLICATIONS

Korean Office Action dated Apr. 13, 2011, issued in corresponding Korean Patent Application No. 2008-7011497.

International Search Report of mailed on Jan. 9, 2007 issued International Patent Application No. PCT/JP2006/319660.

Notification of Transmittal of Translation of the International Preliminary Report on Patentability (Form PCT/IB/338) of International Application No. PCT/JP2006/319660 mailed Sep. 18, 2008 with Forms PCT/IB/373 and PCT/ISA/237.

* cited by examiner

SYSTEM AND METHOD FOR MANUFACTURING OPTICAL DISPLAY

CROSS-REFERENCE TO RELATED APPLICATIONS

This is a divisional application of U.S. patent application Ser. No. 12/093,190, filed on May 9, 2008, currently pending, which is a 371 of International Application No. PCT/JP2006/319660, filed on Oct. 2, 2006, which claims the benefit of priority from the prior Japanese Patent Application No. 2005-332740, filed on Nov. 17, 2005, the entire contents of which are incorporated herein by references.

TECHNICAL FIELD

The invention relates to systems and methods for manufacturing optical displays. More specifically, the invention relates to a system and method for manufacturing an optical display including a laminate of a belt- or sheet-shaped product and an optical display unit.

BACKGROUND ART

According to conventional techniques, optical film makers manufacture a roll of a belt and sheet-shaped product having an optical film component in a continuous manner. Examples of the "belt and sheet-shaped product" include a raw polarizing plate, a raw retardation plate, and a raw laminated film of a polarizing plate and a retardation plate each for use in liquid crystal displays. The optical film component is supplied to panel makers who assemble the optical film component (such as a polarizing plate and a retardation plate) and an optical display unit (such as a sealed glass substrate unit containing a liquid crystal cell) from the optical film makers. The optical film makers punch a desired size pieces, which is desired by the panel makers, from the belt and sheet-shaped product and pack a pile of several punched sheet-shaped product pieces for delivery.

A pressure-sensitive adhesive is used to stick the sheet-shaped product to the optical display unit. The pressure-sensitive adhesive is previously provided as a layer on the sheet-shaped product, and a release film is further provided to protect the pressure-sensitive adhesive layer. In the process of punching pieces from the sheet-shaped product, therefore, the pressure-sensitive adhesive layer can be squeezed out of the punched section. When a pile of several pieces is packed, the squeezing out of the pressure-sensitive adhesive layer (pressure-sensitive adhesive) can cause sticking of the layered sheet-shaped products and can further cause scratches or stains on the surface of the sheet-shaped products to degrade the quality. Against the problem, it is proposed that the end face of the sheet-shaped product should be worked after the punching so that the influence of the squeezing out of the pressure-sensitive adhesive layer can be reduced (see Patent Literature 1 listed below).

Patent Literature 1: Japanese Patent Application Laid-Open (JP-A) No. 2004-167673

DISCLOSURE OF INVENTION

Problems to be Solved by the Invention

The processes of piling several punched sheet-shaped products and packing the resulting pile require a high-cleanliness working environment such that dust, soil and so on can be prevented. In order to prevent scratches, cracks and so on during transportation, the packing material is carefully selected, and the packing process is also carefully performed.

On the other hand, panel makers use the carefully packed sheet-shaped products for assembling. However, unpacking of the carefully packed products is laboring and must be carefully conducted so as not to cause scratches or cracks, which is a significant work load.

After the unpacking, dust or soil must be cleaned from each individual sheet-shaped product, which is a complicated task.

The punched sheet-shaped product with a scratch or crack formed during the process of packing, transferring or unpacking is determined as a defective product. Therefore, there has been demanded for a solution to the problem of a reduction in the product yield or high cost, which is caused by a relatively large number of processes or a complicated process. Since optical displays as final products vary widely in terms of type and size, a wide variety of sheet-shaped products are produced by cutting and punching. For example, if there are 50 types of optical displays, individual makers should manufacture, stock and manage 50 types of sheet-shaped products corresponding thereto. However, properly stocking and managing all types of sheet-shaped products is a very complicated task, and inventory control under proper conditions requires an adequate warehouse space (in a clean room environment).

The invention has been made under the circumstances described above, and it is an object of the invention to provide a system and a method for manufacturing an optical display which allow an improvement in the yield of optical film components, a reduction in cost and an improvement in inventory control.

Means for Solving the Problems

As a result of investigations for solving the problems, the invention described below has been completed.

The invention is directed to an optical display manufacturing system, including: feeding means that feeds a belt and sheet-shaped product including an optical film as a component of the optical display from a roll of the belt and sheet-shaped product; detection means that detects a defect of the belt and sheet-shaped product fed by the feeding means; cutting means that cuts the belt and sheet-shaped product into individual sheet-shaped products based on a result of the detection by the detection means; transfer means that transports each of the sheet-shaped products from the cutting means to a sticking process; and sticking means that sticks the sheet-shaped product transported by the transfer means to an optical display unit as another component of the optical display, wherein all of the means are placed on a continuous manufacturing line.

The effects of the invention are described below. The optical display includes at least the optical film and the optical display unit. The belt and sheet-shaped product includes at least an optical film layer and optionally, for example, a protective film layer. The belt and sheet-shaped product is long and provided in the form of a roll. The belt and sheet-shaped product is fed from the roll, when whether or not defects such as stains, scratches and cracks are present is detected by the detection means.

According to the result of the detection, the belt and sheet-shaped product is cut into specific size pieces. The "specific size" depends on the size of the optical display product. When a certain defect is found as a result of the detection, for example, the cutting means is controlled such that the defect can be removed while specific size cut pieces can be produced. The sheet-shaped product obtained by cutting is then transferred to a sticking process. The transferred sheet-shaped product is stuck to the optical display unit by the sticking means. All of these means are placed on a continuous manufacturing line.

In the above manufacturing system, desired size pieces can be directly obtained by cutting from the belt and sheet-shaped product having the optical film and each stuck to the optical display unit. Therefore, a roll of the belt and sheet-shaped product can be directly packed and delivered to panel makers in contrast to the conventional technique where the belt and sheet-shaped product is subjected to punching, and punched sheet-shaped products are carefully packed and supplied to panel makers. Packing the roll allows easy selection of the packing material, allows simple packing operation with no need of a conventional packing tool or instrument for piling and packing sheet-shaped cut products and allows a reduction in the work load. There is also no need to perform the conventional end face working, which is also significantly advantageous for optical film component makers because of a reduction in the number of working processes.

Panel makers to which the products are supplied can easily perform the unpacking so that the work load can be reduced. Transferring the roll can also reduce the occurrence of scratches, cracks and so on and can prevent quality degradation.

In addition, the packing material can be simple, and the packing material cost and the occurrence of scratches, cracks and so on during the transportation can be reduced, so that the cost performance of the whole of the product can be significantly increased. It is also unnecessary for optical film component makers to cut sheet-shaped products depending on the type and size of the final optical display product or to stock and manage individual sheet-shaped products. The belt and sheet-shaped product itself (in the form of a raw roll) can be stored and managed so that inventory control can be simplified and that control management can be significantly improved. This is also advantageous for panel makers, because it is possible to stock and manage only a single type or few types of row rolls of the belt and sheet-shaped product and to cut a necessary portion (size) in a necessary form for use in manufacture so that expensive optical film stocks can be significantly reduced. According to the invention, therefore, both makers can significantly increase the productivity.

In a preferred embodiment of the invention, the belt and sheet-shaped product has a pressure-sensitive adhesive for sticking to the optical display unit and a release film for protecting the pressure-sensitive adhesive, and the system further includes separating means that separates the release film from the belt and sheet-shaped product before the detection of a defect by the detection means and cleaning means that cleans the belt and sheet-shaped product from which the release film has been separated, before the detection of a defect by the detection means.

In this embodiment, the belt and sheet-shaped product further includes a pressure-sensitive adhesive for sticking the optical display unit and a release film for protecting the pressure-sensitive adhesive. Before a defect is detected by the detection means, the release film is separated from the belt and sheet-shaped product, and the resulting belt and sheet-shaped product is cleaned by the cleaning means so that dust and soil can be removed. According to these features, the detection means can precisely detect scratches, cracks, stains and so on of the optical film component, while scratches, stains and so on of the release film are not detected.

In another preferred embodiment of the invention, the system further includes second detection means that detects a defect after the sticking by the sticking means.

According to this feature, any defect of a laminate of the optical display unit and the sheet-shaped product can be immediately detected after the sticking. As a result of the detection, for example, when a defect is detected on the sheet-shaped product side (the optical film component), the sheet-shaped product (the optical film component) may be separated from the optical display unit, and the separated optical display unit may be recycled (hereinafter this process is referred to as "reworking").

The invention is also directed to a method for manufacturing an optical display, including the steps of: feeding a belt and sheet-shaped product including an optical film as a component of the optical display from a roll of the belt and sheet-shaped product; detecting a defect of the belt and sheet-shaped product supplied by the feeding step; cutting the belt and sheet-shaped product into individual sheet-shaped products based on a result of the detection in the detecting step; transferring each of the sheet-shaped products from the cutting step; and sticking the sheet-shaped product transported by the transferring step to an optical display unit as another component of the optical display, wherein all of the steps are performed on a continuous manufacturing line. The effects of this aspect are the same as those described above.

DESCRIPTION OF REFERENCE MARKS

In the drawings, reference mark 3 represents a row polarizing plate, 3a a polarizing plate, 4 a roll, 5 an optical display unit, 11 feeding rollers (feeding means), 12 detection means, 13 cutting means, 14 suction means (feeding means), 16 suction means (transfer means), 17 a roller component (sticking means), and 18 second detection means.

BEST MODE FOR CARRYING OUT THE INVENTION

Preferred embodiments of the invention are described below.

Sheet-Shaped Product, Optical Display Unit and Optical Display

A description is given of some embodiments using a raw polarizing plate as an example of the sheet-shaped product to be handled according to the invention. The raw polarizing plate is in the form of a long film, and polarizing plates each with a specific size are punched (or cut) from the film-shaped raw polarizing plate. For example, the raw polarizing plate may be produced by sticking a triacetylcellulose film (transparent protective film) to both the front and back sides of a previously prepared polyvinyl alcohol film (polarizer). It is necessary to detect whether or not defects (such as scratches and foreign matter) are present on the surface of or in the interior of the raw polarizing plate with such a multilayer structure. The defects are detected by the detection means described later.

The raw polarizing plate may be produced by a manufacturing method including the steps of: (A) dyeing, crosslinking, stretching, and drying a polyvinyl alcohol film to form a polarizer; (B) sticking a protective layer to one or both sides of the polarizer; and (C) heating the resulting laminate.

The processes of dyeing, crosslinking and stretching the polyvinyl alcohol film are not necessarily independently performed and may be performed at the same time or in any order. The polyvinyl alcohol film may be subjected to a swelling process before use. A general process may include the steps of immersing the polyvinyl alcohol film in a solution containing iodine or a dichroic dye so that the film is dyed with the iodine or the dichroic dye being adsorbed thereon, then washing the film, uniaxially stretching the film at a stretching ratio of 3 to 7 times in a solution containing boric acid, borax or the like, and then drying the film. It is particularly preferred that the step of stretching the film in a solution containing iodine or a dichroic dye should be followed by the steps of stretching the film in a solution containing boric acid, borax or the like (two-stage stretching) and then drying the film, so that the iodine can be highly oriented to provide good polarizing properties.

For example, the polyvinyl alcohol polymer may be a polymer produced by polymerizing vinyl acetate and then saponifying the polymer or a copolymer produced by copolymerizing vinyl acetate with a small amount of a copolymerizable monomer such as an unsaturated carboxylic acid, an unsaturated sulfonic acid, or a cationic monomer. The average polymerization degree of the polyvinyl alcohol polymer is preferably, but not limited to, 1,000 or more, more preferably from 2,000 to 5,000. The saponification degree of the polyvinyl alcohol polymer is preferably 85% by mole or more, more preferably from 98 to 100% by mole.

The thickness of the prepared polarizer is generally, but not limited to, from 5 to 80 μm. The thickness of the polarizer may be controlled by any conventional method such as tentering, roll stretching, and rolling.

No limitation is set on the process of boding the polarizer to the transparent protective film as the protective layer. For example, it may be performed using an adhesive comprising a vinyl alcohol polymer or an adhesive comprising a vinyl alcohol polymer and a water-soluble crosslinking agent therefor such as boracic acid, borax, glutaraldehyde, melamine, and oxalic acid. The adhesive layer may be formed by applying and drying an aqueous solution layer. In the process of preparing the aqueous solution, if necessary, any other additive or a catalyst such as an acid may also be added.

Any appropriate transparent film may be used as the protective film to be placed on one or both sides of the polarizer. In particular, a film comprising a polymer with a high level of transparency, mechanical strength, thermal stability, or water-blocking performance is preferably used. Examples of such a polymer include acetate resins such as triacetylcellulose, polycarbonate resins, polyester resins such as polyarylate and polyethylene terephthalate, polyimide resins, polysulfone resins, polyethersulfone resins, polystyrene resins, polyolefin resins such as polyethylene and polypropylene, polyvinyl alcohol resins, polyvinyl chloride resins, polynorbornene resins, poly(methyl methacrylate) resins, and liquid crystal polymers. The film may be produced by any of a casting method, a calender method and an extrusion method.

The polymer film disclosed in JP-A No. 2001-343529 (WO01/37007) may also be used, for example, which comprises a resin composition containing (A) a thermoplastic resin having a substituted and/or unsubstituted imide group in the side chain and (B) a thermoplastic resin having a substituted and/or unsubstituted phenyl and nitrile groups in the side chain. Specifically, the film comprises a resin composition containing an alternating copolymer of isobutylene and N-methylmaleimide and an acrylonitrile-styrene copolymer. The film may be produced by mixing-extrusion of the resin composition. These films have a low level of retardation and photoelastic coefficient and thus can prevent polarizing plates from having defects such as strain-induced unevenness. They also have low water-vapor permeability and thus have good humidity durability.

The protective film is preferably as colorless as possible. Therefore, the protective film to be used preferably has a retardation of −90 nm to +75 nm in its thickness direction, wherein the retardation (Rth) in the thickness direction is expressed by the formula Rth=[(nx+ny)/2−nz]d, wherein nx and ny are each the principal in-plane refractive index of the film, nz is the refractive index of the film in its thickness direction, and d is the thickness of the film. If the protective film used has a retardation (Rth) of −90 nm to +75 nm in its thickness direction, protective film-induced coloration of polarizing plates (optical coloration) can be substantially avoided. The retardation (Rth) in the thickness direction is more preferably from −80 nm to +60 nm, particularly preferably from −70 nm to +45 nm.

In view of polarizing properties and durability, acetate resins such as triacetylcellulose are preferred, and a triacetylcellulose film whose surface has been saponified with an alkali is particularly preferred. When a transparent protective film is provided on both sides of the polarizing film, the front and back transparent protective films may comprise different polymers.

While the protective film may have any thickness, it generally has a thickness of 500 μm or less, preferably of 1 to 300 μm, particularly preferably of 5 to 200 μm, in order to form a relatively thin polarizing plate. When a transparent protective film is provided on both sides of the polarizing film, the front and back transparent protective films may comprise different polymers.

The transparent protective film may be subjected to hard coat treatment, anti-reflection treatment, anti-sticking treatment, diffusion or antiglare treatment, or the like, as long as the effects of the invention are not reduced. Hard coat treatment may be performed in order to prevent scratches on the polarizing plate surface and the like. The hard coat may be formed by a method including making a cured film with a high level of hardness and smoothness on the surface of the transparent protective film from an appropriate ultraviolet-curable resin such as a silicone resin.

Anti-reflection treatment may be performed in order to prevent reflection of external light on the polarizing plate surface. It may be achieved by forming an anti-reflection film or the like according to conventional techniques. Anti-sticking treatment may be performed in order to prevent sticking to the adjacent layer, and antiglare treatment may be performed in order to prevent interference from reflection of external light on the polarizing plate surface to visibility of light transmitted through the polarizing plate. The anti-sticking or anti-glare part may be formed by providing fine irregularities on the surface of the transparent protective film by any appropriate method such as a surface roughening method such as sand blasting and embossing or a method of mixing transparent fine particles.

For example, the transparent fine particles may be silica, alumina, titania, zirconia, tin oxide, indium oxide, cadmium oxide, antimony oxide, or the like with an average particle size of 0.5 to 20 μm. Electrically-conductive inorganic fine particles or organic fine particles of a crosslinked or uncrosslinked particulate polymer may also be used. The transparent fine particles are generally used in an amount of 2 to 70 parts by mass, particularly in an amount of 5 to 50 parts by mass, based on 100 parts by mass of the transparent resin.

The transparent fine particles-containing antiglare layer may also be formed as the transparent protective layer itself or as a coating layer on the surface of the transparent protective layer. The antiglare layer may also serves as a diffusion layer (with a viewing angle compensation function or the like) to diffuse light being transmitted through the polarizing plate and to expand the viewing angle. The anti-reflection layer, the anti-sticking layer, the diffusion layer, the antiglare layer, or the like may be provided as an optical layer of a sheet having such a functional layer independent of the transparent protective layer.

In an embodiment of the invention, the sheet-shaped product may be a laminate including any of various optical layers and may be used as an optical film for practical use. Examples of the optical layers for such a laminate include, but are not limited to, layers formed by hard coat treatment, anti-reflection treatment, or surface treatment for an anti-sticking, diffusion or antiglare purpose, on the transparent protective film surface to which no polarizer is stuck (the surface on which the adhesive coating layer is not provided) and oriented liquid crystal layers for viewing angle compensation or the like. The sheet-shaped product may also be a laminate including one or more layers of an optical film or films for use in forming liquid crystal displays or the like, and examples of such an optical film include a reflector, a transflector (or a semitransparent reflector), a retardation plate (including a wave plate (λ plate) such as a half-wave plate (λ/2 plate) and a quarter wavelength plate (λ/4 plate)), and a viewing angle compensation film. In particular, the sheet-shaped product for use as a polarizing plate is preferably a reflector- or transflector-laminated reflective or transflective polarizing plate, a retardation plate-laminated elliptically or circularly polarizing plate, a viewing angle compensation layer- or film-laminated, wide-viewing-angle, polarizing plate, or a brightness enhancement film-laminated polarizing plate.

The reflective polarizing plate includes a polarizing plate and a reflective layer formed thereon and may be used to form a certain type liquid crystal display in which light incident on the viewer side (display side) is reflected and displayed. It has the advantage that a built-in light source such as a backlight can be omitted so that a thin liquid crystal display can be easily produced. The reflective polarizing plate may be formed by any appropriate method such as a method including forming a reflective layer of metal or the like on one side of a polarizing plate with an optional transparent protective layer or the like interposed therebetween.

In the reflective polarizing plate, for example, the reflective layer is formed by providing a foil or vapor-deposited film of a reflective metal such as aluminum on one side of the transparent protective film that is optionally matte-finished. Alternatively, the transparent protective film may contain fine particles so as to form a fine irregular surface structure, and the reflective layer formed thereon may have fine irregularities. The reflective layer with fine irregularities has the advantage that incident light can be diffused by irregular reflection so that directional bias or glare can be prevented and that uneven brightness or darkness can be reduced. The fine particles-containing transparent protective film also has the advantage that when transmitted therethrough, incident light and reflected light therefrom can be diffused so that uneven brightness or darkness can be further reduced. The reflective layer having fine irregularities corresponding to the fine irregular surface structure of the transparent protective film may be formed by a method including directly depositing a metal on the surface of the transparent protective layer by a vapor deposition method such as vacuum deposition, ion plating and sputtering, a plating method or any other appropriate method.

Instead of the method of direct deposition on the transparent protective film of the polarizing plate, the reflector may be used in the form of a reflective sheet including an appropriate film corresponding to the transparent film and a reflective layer formed thereon. The reflective layer is generally made of a metal. In order to prevent an oxidation-induced reduction in reflectance and to keep the initial reflectance for a long time or in order to avoid the formation of an additional protective layer, therefore, the reflective surface is preferably covered with the transparent protective film, the polarizing plate or the like, when used.

The transflective polarizing plate may be produced by the method described above, except that a transflective layer capable of reflecting and transmitting light such as a half mirror is used in place of the reflective layer. The transflective polarizing plate is generally placed on the back side of a liquid crystal cell to form a certain type liquid crystal display in which an image is displayed by reflecting light incident on the viewer side (display side) during operation in a relatively bright place, and an image is displayed using a built-in light source, such as a backlight, placed on the back side of the transflective polarizing plate during operation in a relatively dark place. Therefore, the transflective polarizing plate is useful for forming a certain type liquid crystal display that uses a built-in light source such as a backlight in a relatively dark place, while saving the energy of the available light source in a relatively bright place.

A description is given of the elliptically or circularly polarizing plate including a polarizing plate and a retardation plate placed thereon. Retardation plates or the like are used to convert linearly polarized light into elliptically or circularly polarized light, to convert elliptically or circularly polarized light into linearly polarized light or to change the direction of polarization of linearly polarized light. Specifically, so-called quarter wavelength plates (also referred to as λ/4 plates) are used as retardation plates for converting linearly polarized light into circularly polarized light or converting circularly polarized light into linearly polarized light. Half-wave plates (also referred to as λ/2 plates) are generally used to change the direction of polarization of linearly polarized light.

The elliptically polarizing plate is effectively used in cases where coloration (blue or yellow) caused by the birefringence of a liquid crystal layer in a super-twisted nematic (STN) liquid crystal display should be compensated for (canceled) such that white and black can be displayed without the coloration. The elliptically polarizing plate with controlled three-dimensional refractive indices is also preferred, because it can also compensate for (cancel) coloration that occurs when the screen of a liquid crystal display is obliquely viewed. For example, the circularly polarizing plate is effectively used in cases where the tone of color images displayed by a reflective liquid crystal display should be adjusted. The circularly polarizing plate can also have an anti-reflection function.

The retardation plate may also be used. Examples of the retardation plate include birefringent films produced by uniaxially or biaxially stretching polymer materials, oriented liquid crystal polymer films, and oriented liquid crystal polymer layers supported on films. The stretching process may be typically performed by roll stretching, long-gap stretching, tenter stretching, or tubular stretching. Uniaxial stretching is generally performed at a stretching ratio of about 1.1 to about 3 times. The thickness of the retardation plate is generally, but not limited to, from 10 to 200 μm, preferably from 20 to 100 μm.

Examples of the polymer materials include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyvinyl alcohol, polyamide, polyimide, polyolefin, polyvinyl chloride, cellulose polymers, and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a conjugated linear atomic group (mesogen) that is introduced in the main or side chain of the polymer to impart liquid crystal molecular orientation. Examples of the main chain type liquid crystal polymer include polymers having a mesogen group bounded thereto through a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto through a spacer moiety comprising a conjugated atomic group. For example, any of these liquid crystal polymers may be applied by a process that includes: spreading a solution of the liquid crystalline polymer on an alignment surface, such as a rubbed surface of a thin film of polyimide, polyvinyl alcohol or the like or an obliquely vapor-deposited silicon oxide surface, formed on a glass plate; and heat-treating the solution.

The retardation plate may have any appropriate retardation depending on the intended use such as compensation for coloration, viewing angle, or the like associated with the birefringence of various wave plates or liquid crystal layers. Two or more types of retardation plates may also be laminated to provide controlled optical properties such as controlled retardation.

The viewing angle compensation film is for expanding the viewing angle such that images can be relatively clearly viewed even when the screen of a liquid crystal display is viewed from directions not perpendicular but somewhat oblique to the screen. Examples of such a viewing angle compensation retardation plate include a retardation film, an oriented film of a liquid crystal polymer or the like, and an oriented layer of a liquid crystal polymer or the like supported on a transparent substrate. General retardation plates are produced with a polymer film that is uniaxially stretched in the in-plane direction and has birefringence. On the other hand, retardation plates for use as the viewing angle compensation film are produced with a bi-directionally stretched film such as a polymer film that is biaxially stretched in the in-plane direction and has birefringence, a polymer film that is uniaxially stretched in the in-plane direction and also stretched in the thickness direction so that it has a controlled refractive index in the thickness direction and has birefringence, and an obliquely oriented film. Examples of the obliquely oriented film include a film produced by a process including sticking a heat-shrinkable film to a polymer film and stretching and/or shrinking the polymer film under the action of the heat-shrinkage force, and an obliquely-oriented liquid crystal polymer film. The raw material polymer for the retardation plate may be the same as the polymer described above for the retardation plate, and any appropriate polymer may be used depending on the purpose such as prevention of coloration caused by changes in viewing angle based on the retardation of a liquid crystal cell and expansion of the viewing angle at which good visibility is achieved.

In order to expand the viewing angle at which good visibility is achieved, an optical compensation retardation plate is preferably used that includes a triacetylcellulose film and an optically-anisotropic layer of an oriented liquid crystal polymer, specifically an obliquely-oriented discotic liquid crystal polymer layer, supported on the film.

A laminate of the polarizing plate and the brightness enhancement film is generally placed on the back side of a liquid crystal cell, when used. The brightness enhancement film exhibits the property that when light is incident on it from a backlight of a liquid crystal display or the like or when natural light is reflected on the back side and incident on it, it reflects linearly polarized light with a specific polarization axis or reflects circularly polarized light in a specific direction and transmits the other part of the light. When light from a light source such as a backlight is incident on the laminate of the polarizing plate and the brightness enhancement film, transmitted light in a specific polarization state is produced, and light in the state other than the specific polarization sate is not transmitted but reflected. The light reflected from the surface of the brightness enhancement film may be reversed by a reflective layer or the like provided behind the brightness enhancement film and allowed to reenter the brightness enhancement film so that the light can be entirely or partially transmitted in the specific polarization state. Therefore, the quantity of the light transmitted through the brightness enhancement film can be increased, and polarized light, which is less likely to be absorbed by the polarizer, can be supplied so that the brightness can be enhanced by increasing the quantity of the light available at a liquid crystal display or the like. If the brightness enhancement film is not used when the light of a backlight or the like is allowed to enter from the back side of a liquid cell through a polarizer, light whose polarization direction does not coincides with the polarization axis of the polarizer will be almost absorbed (not transmitted) by the polarizer. Therefore, about 50% of the light can be absorbed by the polarizer, depending on the characteristics of the polarizer, so that the quantity of the light available for image display on a liquid crystal display or the like can be reduced and that the brightness of the image can be lowered. Light that has a polarization direction such that it can be absorbed by the polarizer is not allowed to enter but temporarily reflected by the brightness enhancement film and then reversed by a reflective layer or the like placed behind the brightness enhancement film and allowed to reenter the brightness enhancement film. This process is repeated so that the brightness enhancement film can transmit polarized light to the polarizer only when the polarized light reflected and reversed by them has a polarization direction such that it can pass through the polarizer. Therefore, the brightness enhancement film allows efficient use of light from a backlight or the like for image display on a liquid crystal display and thus allows an increase in the brightness of the screen.

The diffusion plate may be placed between the brightness enhancement film and the reflective layer or the like. When the polarized light reflected from the brightness enhancement film goes to the reflective layer or the like, the diffusion plate placed therebetween can uniformly diffuse the light passing therethrough and simultaneously cancel the polarization state to produce an unpolarized state. Namely, the diffusion plate can convert polarized light back into natural light in the initial state. The light in the unpolarized state, namely in the natural light state, goes to the reflective layer or the like and is reflected therefrom and passes through the diffusion plate again and reenter the brightness enhancement film. This process is repeated. Therefore, the diffusion plate that is placed between the brightness enhancement film and the reflective layer or the like to convert the polarization state back into the initial natural light state can reduce unevenness of the brightness of the display screen, while maintaining the brightness of the display screen, so that the resulting screen can be uniform and bright. When the diffusion plate is provided as described above, the number of times of repeated reflection of the initial incident light can be properly increased so that a bright uniform display screen can be provided together with the diffusion function of the diffusion plate.

Examples of the brightness enhancement film that may be used include a film having the property of transmitting linearly polarized light with a specific polarization axis and reflecting the other type of light, such as a dielectric multilayer thin film and a multilayer laminate of thin films different in refractive index anisotropy, and a film having the property of reflecting one of clockwise circularly polarized light and counterclockwise circularly polarized light and transmitting the other, such as an oriented cholesteric liquid crystal polymer film and an oriented cholesteric liquid crystal layer supported on a film substrate.

When the brightness enhancement film having the property of transmitting linearly polarized light with a specific polarization axis is used, the light transmitted therethrough may be allowed to directly enter the polarizing plate, while the polarization axis is aligned, so that the light can be efficiently transmitted, while the absorption loss of the polarizing plate can be reduced. When the brightness enhancement film having the property of transmitting circularly polarized light, such as the cholesteric liquid crystal layer, is used, the transmitted circularly polarized light may be allowed to directly enter the polarizer. In order to reduce the absorption loss, however, it is preferred that the transmitted circularly polarized light should be converted into linearly polarized light through a retardation plate and then allowed to enter the polarizing plate. Using a quarter wavelength plate as the retardation plate, circularly polarized light can be converted into linearly polarized light.

A retardation plate functioning as a quarter wavelength plate in a wide wavelength range such as the visible light range may be produced by laminating a retardation layer functioning as a quarter wavelength plate for monochromatic light such as light with a wavelength of 550 nm and another retardation layer exhibiting other retardation properties, such as a retardation layer functioning as a half-wave plate. Therefore, the retardation plate placed between the polarizing plate and the brightness enhancement film may include one or more retardation layers.

Two or more cholesteric liquid crystal layers with different reflection wavelengths may also be laminated so that the resulting combined structure can reflect circularly polarized light in a wide wavelength range such as the visible light range, and as a result, circularly polarized light in a wide wavelength range can be transmitted.

In an embodiment of the invention, the sheet-shaped product (such as a polarizing plate) may comprise a laminate of a polarizing plate and two or more optical layers, like the polarized light-separating polarizing plate described above. Therefore, the sheet-shaped product may also be a reflective or transflective elliptically polarizing plate that is a combination of the reflective or transflective polarizing plate and a retardation plate.

An optical film comprising a laminate of the polarizing plate and the optical layer may be formed by a method of stacking them one by one in the process of manufacturing a liquid crystal display or the like. However, an optical film formed by previous lamination is stable in quality and has the advantage that it can facilitate the process of manufacturing a liquid crystal display or the like, because of its good assembling workability. In the lamination, any appropriate sticking means such as adhesive layers may be used. When the polarizing plate and other optical layers are stuck to one another, their optical axes may be each aligned at an appropriate angle, depending on the desired retardation properties or the like.

In an embodiment of the invention, the polarizing plate or the laminated optical component may also have a pressure-sensitive adhesive layer for sticking it to another component such as a liquid crystal cell. The pressure-sensitive adhesive layer may be formed of any appropriate pressure-sensitive adhesive such as an acrylic pressure-sensitive adhesive according to conventional techniques. The pressure-sensitive adhesive layer preferably has low moisture absorption coefficient and high heat resistance, in order to prevent moisture absorption-induced foaming or peeling, to prevent optical property degradation due to a thermal expansion difference or the like, to prevent warping of a liquid crystal cell, and to form an image display with high quality and high durability. The pressure-sensitive adhesive layer may also contain fine particles so as to have light diffusing properties. The pressure-sensitive adhesive layer may be provided as needed on a necessary surface. Concerning the polarizing plate comprising the polarizer and the protective film, for example, a pressure-sensitive adhesive layer may be provided as needed on one or both sides of the protective film.

The exposed surface of the pressure-sensitive adhesive layer may be temporarily covered with a separator (corresponding to the release film) for antifouling or the like until it is put to use. This can prevent contact with the pressure-sensitive adhesive layer during usual handling. Except for the thickness conditions described above, conventional appropriate separators may be used such as appropriate thin leaves including plastic films, rubber sheets, paper, cloth, nonwoven fabric, net, foam sheets, metal leafs, and laminates thereof, which are optionally coated with any appropriate release agent such as a silicone, long-chain alkyl or fluoride release agent and molybdenum sulfide.

In an embodiment of the invention, an ultraviolet absorbing capability may be imparted to the polarizer, the protective film, or the optical film for the polarizing plate or to each layer such as the pressure-sensitive adhesive layer, for example, by treatment with an ultraviolet-absorbing agent such as salicylate ester compounds, benzophenol compounds, benzotriazole compounds, cyanoacrylate compounds, and nickel complex salt compounds.

The sheet-shaped product according to the invention is preferably used to form an image display (corresponding to the optical display) such as a liquid crystal display, an organic electroluminescence display (organic EL display) and a plasma display panel (PDP).

The polarizing plate or the optical film according to the invention is preferably used to form any of various devices such as liquid crystal displays. Liquid crystal displays may be formed according to conventional techniques. Specifically, a liquid crystal display may be typically formed by assembling a liquid crystal cell (corresponding to the optical display unit) and polarizing plates or optical films, and optional components such as a lighting system and incorporating a driving circuit, according to conventional techniques, except that the polarizing plate or the optical film is used according to the invention. The liquid crystal cell to be used may also be of any type such as TN type, STN type and π type.

Any appropriate liquid crystal display may be formed such as a liquid crystal display including a liquid crystal cell and the polarizing plate or the optical film placed one or both sides of the liquid crystal cell and a liquid crystal display using a backlight or a reflector in a lighting system. In this case, the polarizing plate or the optical film according to the invention may be placed one or both sides of the liquid crystal cell. The polarizing plates or the optical films placed on both sides may be the same or different. In the process of forming the liquid crystal display, one or more layers of an additional appropriate component or components such as a diffusion plate, an antiglare layer, an anti-reflection film, a protective plate, a prism array, a lens array sheet, a light diffusion plate, and a backlight may also be placed at an appropriate position or positions.

Next, a description is given below of an organic electroluminescence device (organic EL display). An organic EL display generally includes a transparent substrate and a light-emitting element (an organic electroluminescence light-emitting element corresponding to the optical display unit) that is formed on the substrate by laminating a transparent electrode, an organic light-emitting layer and a metal electrode in this order. In this structure, the organic light-emitting layer is a laminate of different organic thin films. Known laminate structures have various combinations, including a laminate of a hole injection layer comprising a triphenylamine derivative or the like and a light-emitting layer comprising a fluorescent organic solid material such as anthracene, a laminate of such a light-emitting layer and an electron injection layer comprising a perylene derivative or the like, and a laminate of the hole injection layer, the light-emitting layer and the electron injection layer.

The organic EL display emits light based on the mechanism that holes and electrons are injected into the organic light-emitting layer upon application of a voltage between the transparent electrode and the metal electrode so that the energy generated by the recombination of the holes and the electrons excites the fluorescent substance, and light is emitted when the excited fluorescent substance goes back to the ground state. The mechanism of the recombination during the process is similar to that in general diodes. As expected from this feature, current and emission intensity exhibit strong nonlinearity accompanied by rectification with respect to applied voltages.

In the organic EL display, at least one of the electrodes must be transparent for the output of the emission from the organic light-emitting layer, and a transparent electrode made of a transparent electrical conductor such as indium tin oxide (ITO) is generally used as an anode. On the other hand, for the purpose of facilitating the electron injection and increasing the luminous efficiency, it is important to use a low-work-function substance for the cathode, and an electrode of a metal such as Mg—Ag and Al—Li is generally used.

In the organic EL display with such a configuration, the organic light-emitting layer is formed of a very thin film with a thickness of about 10 nm. Therefore, light is almost entirely transmitted through the organic light-emitting layer, as well as through the transparent electrode. In the off-state, therefore, light incident on the surface of the transparent substrate is transmitted through the transparent electrode and the organic light-emitting layer and reflected from the metal electrode to return to and exit from the surface of the transparent substrate, so that the screen of the organic EL display looks like a mirror surface when it is viewed from the outside.

An organic EL display including an organic electroluminescence light-emitting element comprising an organic light-emitting layer for emitting light upon voltage application, a transparent electrode provided on the front side of the light-emitting layer and a metal electrode provided on the back side of the light-emitting layer may also include a polarizing plate provided on the front side of the transparent electrode and a retardation plate provided between the transparent electrode and the polarizing plate.

The retardation plate and the polarizing plate act to polarize light that enters from the outside and is reflected from the metal electrode. Therefore, their polarization action is effective in preventing the mirror surface of the metal electrode from being visible from the outside. Specifically, the retardation plate may comprise a quarter wavelength plate, and the angle between the polarization directions of the polarizing plate and the retardation plate may be set at $\pi/4$, so that the mirror surface of the metal electrode can be completely shielded.

Of external light incident on the organic EL display, therefore, only a linearly polarized light component is transmitted by the polarizing plate. The linearly polarized light is generally turned into elliptically polarized light by the retardation plate. Particularly when the retardation plate is a quarter wavelength plate and the angle between the polarization directions of the polarizing plate and the retardation plate is $\pi/4$, the linearly polarized light is turned into circularly polarized light.

The circularly polarized light is transmitted through the transparent substrate, the transparent electrode and the organic thin film, reflected from the metal electrode, transmitted through the organic thin film, the transparent electrode and the transparent substrate again, and turned into linearly polarized light again by the retardation plate. The linearly polarized light has a polarization direction orthogonal to that of the polarizing plate and therefore cannot pass through the polarizing plate. As a result, the mirror surface of the metal electrode can be completely shielded.

The sheet-shaped product (such as the polarizing plate) according to the invention is preferably used to form various devices such as liquid crystal displays. The sheet-shaped product (such as the polarizing plate) according to the invention may be placed on one or both sides of a liquid crystal cell to form a liquid crystal display having an appropriate structure according to conventional techniques, such as a transmissive, reflective or transflective liquid crystal display. The liquid crystal cell for forming the liquid crystal display may be of any type. Any appropriate type of liquid crystal cell such as a simple matrix driving type typified by a thin film transistor type may be used.

The polarizing plates or the optical components provided on both sides of a liquid crystal cell may be the same or different. In the process of forming a liquid crystal display, one or more layers of an additional appropriate component or components such as a prism array sheet, a lens array sheet, a light diffusion plate, and a backlight may be placed at an appropriate position or positions.

Configuration of the System for Manufacturing Optical Displays

Figure 1:
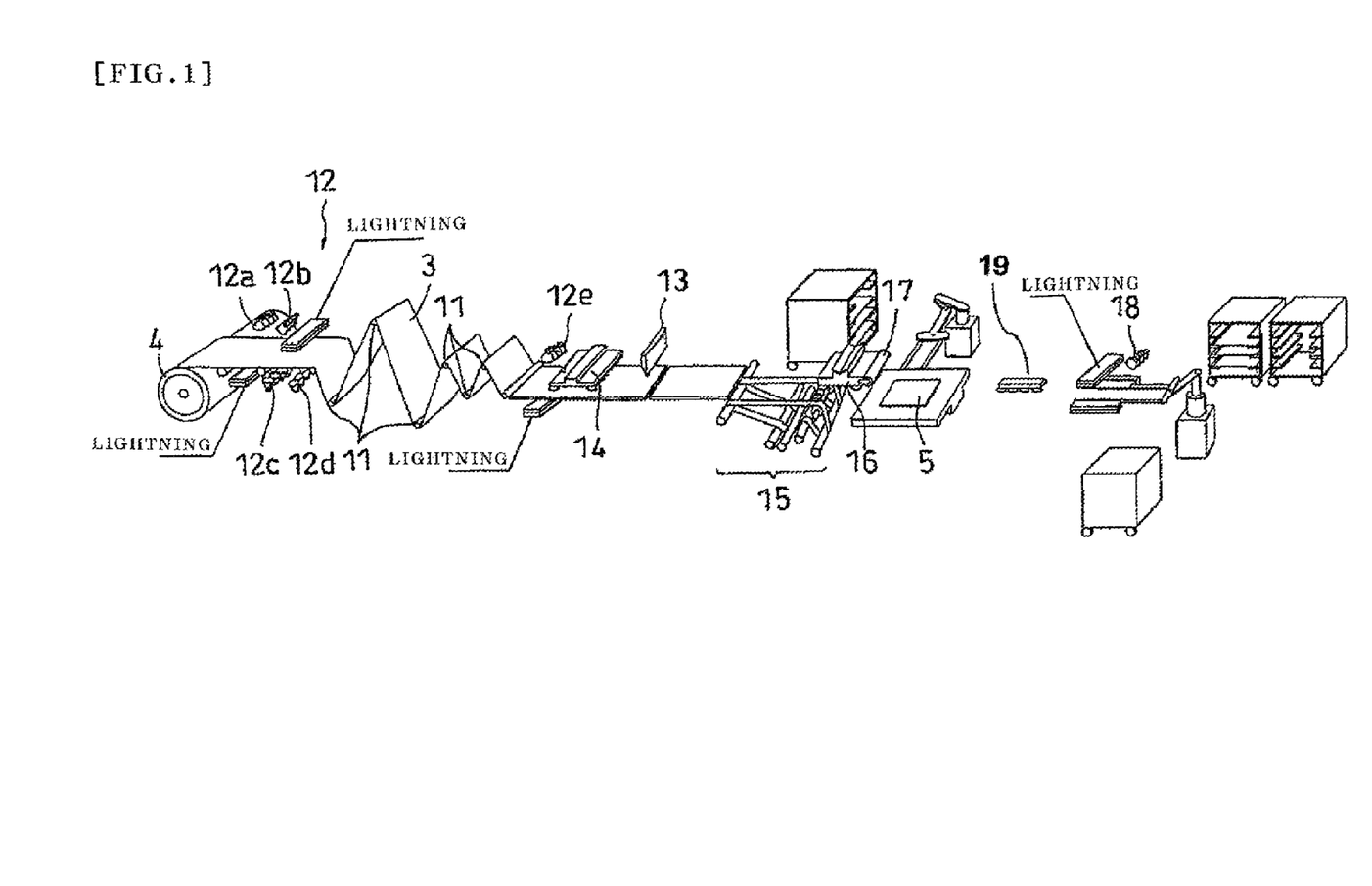
FIG. 1 is a schematic diagram of the entire configuration of a manufacturing system.

FIG. 1 is a diagram illustrating the configuration of a system for manufacturing optical displays according to the invention. For the sake of illustration, a description is given below of a case where a raw polarizing plate is used as the belt and sheet-shaped product.

Transfer means (corresponding to the feeding means) allows the placement of a roll 4 of a raw polarizing plate 3 and is configured such that the raw polarizing plate 3 is fed from the roll 4. The transfer means comprises feeding rollers 11 and so on, while it may be of any type as long as it has the transferring function.

Separating means (not shown) separates a release film (not shown) from the raw polarizing plate 3 before or after the detection of defects by detection means 12 as described later. The separation is preferably performed before the detection of defects by the detection means 12. Cleaning means cleans the raw polarizing plate 3 from which the release film has been separated. Known techniques may be used for the separating means 14 and the cleaning means 15.

The detection means 12 detects defects on one or both sides of the raw polarizing plate 3 being fed from the roll 4. Examples of "defects" include scratches, stains and cracks. For example, the detection means 12 includes a lighting system and a plurality of CCD (charge-coupled device) cameras arranged in a single line along the direction of the width of the raw polarizing plate 3 (see JP-A No. 2005-62165, Page 13).

In order to detect surface defects of the raw polarizing plate 3, for example, a first camera line 12a includes four CCD cameras placed along the direction of the width of the raw polarizing plate 3, and a second camera line 12b also includes four CCD cameras placed along the same width direction.

The second camera line 12b is placed downstream from the first camera line 12a, and two lines are provided in order to ensure the detection of defects. A third camera line 12c and a fourth camera line 12d are also placed in the same manner for the back side. In addition, a fifth camera line 12e is preferably placed such that defects formed during the transferring process and other defects missed by the first to fourth camera lines can be detected immediately before the cutting process described later.

The images taken with the first to fifth camera lines 12a to 12e are sent to an image processing unit (not shown) which detects defects on the surface of and in the interior of the raw polarizing plate 3 based on an image processing technique. The image processing unit may be implemented by a kind of software such as an image processing program. Of course, the image processing unit may comprise a kind of hardware. The image processing unit determines whether or not and where defects exist. As described above, the first to fifth camera lines 12a to 12e and the image processing unit function as the detection means 12 to detect defects of the raw polarizing plate 3. A known defect-judging algorithm may be used when the process is implemented by the image processing program.

Based on the result of the detection by the detection means 12, the cutting means 13 cut the raw polarizing plate 3 into individual sheet-shaped products (polarizing plates 3a) each with a specific size. For example, "cutting" may be performed by a guillotine method, a punching method, a laser cutting method, or the like. A laser cutting method is preferably used, because the cut section is smooth and because squeezing out of a pressure-sensitive adhesive can be prevented when the belt and sheet-shaped product is a raw laminated film having a pressure-sensitive adhesive layer. The raw polarizing plate 3 is sucked under a negative pressure by suction means 14, and a part of a specific size is transported and cut by the cutting means 13.

In the cutting process, specific size pieces are produced. The size data may be stored in a memory before hand or input or selected as appropriate by the system operator.

A description is given below of the cutting process in the case where defects are detected. After defects are detected, the raw polarizing plate 3 is successively transported by the feeding means including the feeding rollers 11 and the suction means 14. The cutting means 13 cuts the defect-containing portion of the raw polarizing plate 3. In this process, for example, when the defect is located 20 cm from the last cut section, the raw polarizing plate 3 is fed and cut at a position located 21 cm from the cut section. The cut piece of the polarizing plate 3a is determined as a defective and transported and rejected along defective transfer means 15. When the specific size is 50 cm from the cut section, this cutting process can significantly increase the yield of the polarizing plate 3a. For example, the transfer means 15 may be implemented by a belt conveyor to transport defectives.

When a punching method is used for the cutting means 13, different punching dies may be used to punch polarizing plates 3a of different sizes. Namely, polarizing plates 3a of different sizes may be obtained from the same raw polarizing plate 3. When a laser cutting method is used, the cutting region setting may be changed so that polarizing plates 3a of different sizes can be obtained by cutting.

Figure 2:
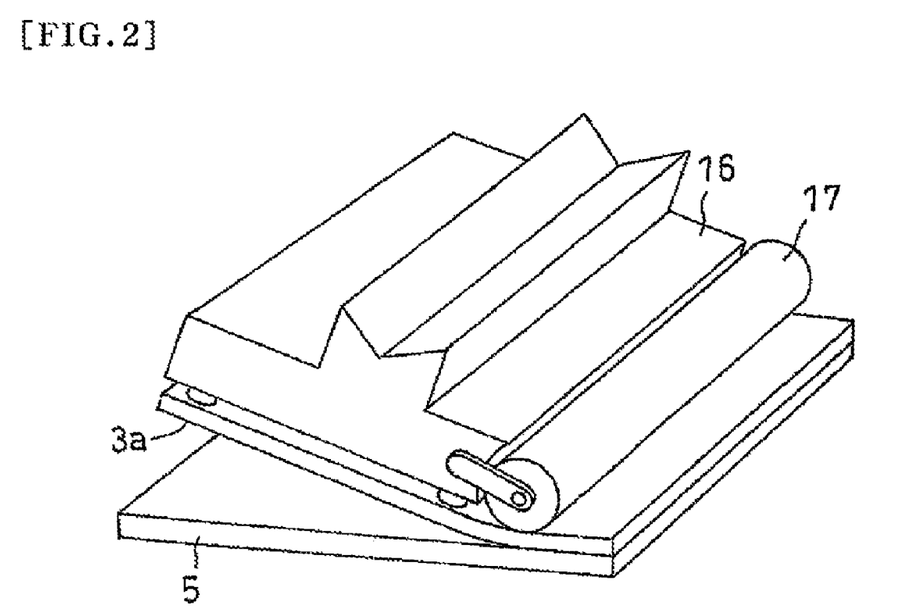
FIG. 2 is a diagram showing an example of sticking means.

When no defect is detected, the cut piece of the polarizing plate 3a with a specific size is transported to a sticking process. The polarizing plate 3a is sucked under negative pressure by suction means 16 (corresponding to the transfer means) and transported thereby without being damaged. As shown in FIG. 2, a liquid crystal cell substrate 5 (an optical display unit) is previously placed, and the polarizing plate 3a is placed on the liquid crystal cell substrate 5 by the suction means 16. In this process, a roller component 17 (corresponding to the laminating means) works together with the suction means 16 to press and stick the polarizing plate 3a onto the liquid crystal cell substrate 5, while rolling. This process can suppress air-bubble contamination so that the defoaming or degassing process described later can be eliminated or reduced in time. The sticking process using the roller component 17 may be replaced by any other method such as a sticking process using a roller component not mechanically coupled to the suction means 16. The transfer means is not limited to the suction system, and a belt conveyor system may be used instead.

Suction means 19 then transports, to the next process, the liquid crystal display (corresponding to the optical display) comprising a laminate of the polarizing plate 3a and the liquid crystal cell substrate 5. The suction means 19 has the same function as the suction means 14 or 16.

Second detection means 18 then detects defects on the transported liquid crystal display. The detection may be performed by the same method as described for the detection means 12. When any defect is detected, reworking is performed. When no defect is detected, defoaming is performed. The other surface to which no polarizing plate 3a is stuck may be turned upside down such that another polarizing plate 3a can be stuck thereto in the same manner. The defoaming process may be performed before the detection of defects by the second detection means 18.

Flow Chart of Manufacturing Process

Figure 3:
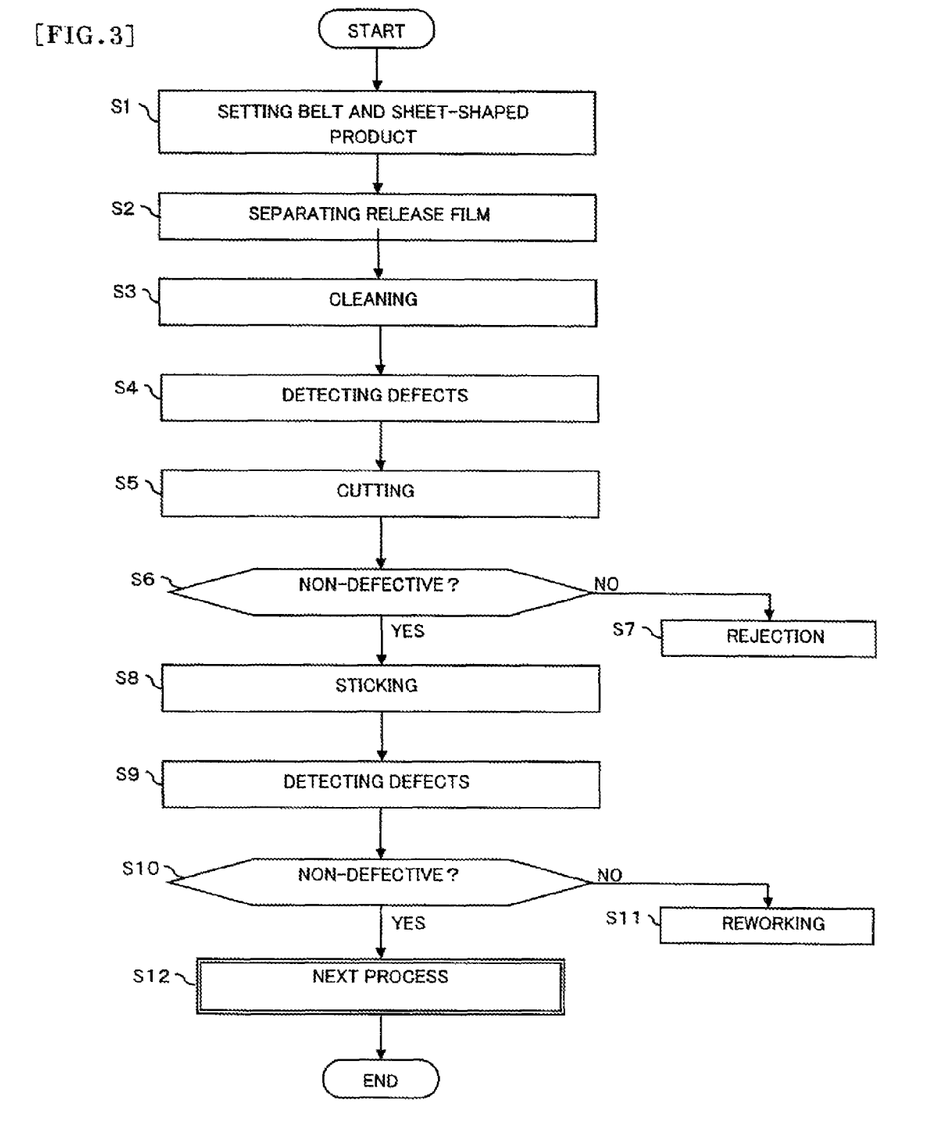
FIG. 3 is a flowchart of a manufacturing method.

A method for manufacturing an optical display according to the invention is described below with reference to the flow chart of FIG. 3.

First, a belt and sheet-shaped product (for example, a raw polarizing plate) is placed in a manufacturing system (S1). The belt and sheet-shaped product is supplied in the form of a roll from an optical film maker. An assembling manufacturer unpacks the roll product, cleans the surface of the roll and places the roll in a manufacturing system.

A release film is then separated (S2). Thereafter, the belt and sheet-shaped product is cleaned (S3). The cleaning is preferably performed on the product with a weak pressure-sensitive adhesive.

The process of detecting defects is then performed (S4), and based on the result of the detection, a non-defective piece or pieces of a specific size are cut, or a defect-containing portion or portions are cut (S5). The cut piece determined as having a defect portion (S6) is rejected as a defective (S7). The cut piece determined as a non-defective (S6) is subjected to a laminating process (S8). The detection process may be performed several steps.

The detection of defects is then performed on an optical display (S9). As a result of the detection, the product determined as a defective (S10) is subjected to reworking (S11). The product determined as a non-defective (S10) is subjected to the next process (S12). An example of the next process is defoaming. In an illustrative process, the other surface where no sheet-shaped product is stuck may be turned upside down such that it can be subjected to the process of sticking another sheet-shaped product thereto.

Other Embodiments

The invention is not limited to manufacturing systems and methods in which only a polarizing plate or plates are stuck to an optical display unit. The invention may also be applied to cases where a retardation plate is stuck to an optical display unit or to cases where a polarizing plate and a retardation plate is integrally stuck to an optical display unit. The optical unit may also be other than the liquid crystal cell substrate.

What is claimed is:

1. A method for manufacturing an optical display, comprising the steps of:
   feeding a belt and sheet-shaped product comprising at least
     (i) an optical film as a component of the optical display,
     (ii) a pressure-sensitive adhesive for sticking to the optical display unit and (iii) a release film for protecting the pressure-sensitive adhesive from a roll of the belt and sheet-shaped product;
   detecting a defect of the belt and sheet-shaped product supplied by the feeding step;
   thoroughly cutting all layers of the belt and sheet-shaped product into individual sheet-shaped products based on a result of the detection in the detecting step so as to separate the individual sheet-shaped products having no defect from the individual sheet-shaped products having a defect;
   transferring each of the sheet-shaped products having no defect from the cutting step; and
   sticking the sheet-shaped product transported by the transferring step to an optical display unit as another component of the optical display with the pressure-sensitive adhesive interposed therebetween, wherein all of the steps are performed on a continuous manufacturing line.

2. The method for manufacturing an optical display according to claim 1, wherein
   the method further comprising the steps of;
   separating the release film from the belt and sheet-shaped product before the detecting step and;
   cleaning the belt and sheet-shaped product from which the release film has been separated, before the detecting step.

3. The method for manufacturing an optical display according to claim 1, wherein the method further comprising the step of;
   detecting a defect of the optical display after the sticking step.

4. The method for manufacturing an optical display according to claim 2, wherein the method further comprising the step of;
   detecting a defect of the optical display after the sticking step.

* * * * *